US009724837B2

(12) United States Patent
Green et al.

(10) Patent No.: US 9,724,837 B2
(45) Date of Patent: Aug. 8, 2017

(54) APPARATUS AND PROCESS FOR CUTTING ADHESIVE LABELS

(71) Applicant: Avery Dennison Corporation, Glendale, CA (US)

(72) Inventors: Alan Green, Greenwood, SC (US); Dennis R. Benoit, Simpsonville, SC (US)

(73) Assignee: Avery Dennison Corporation, Glendale, CA (US)

( * ) Notice: Subject to any disclaimer, the term of this patent is extended or adjusted under 35 U.S.C. 154(b) by 16 days.

(21) Appl. No.: 14/867,294

(22) Filed: Sep. 28, 2015

(65) Prior Publication Data

US 2016/0016323 A1    Jan. 21, 2016

Related U.S. Application Data

(63) Continuation of application No. 13/003,771, filed as application No. PCT/US2009/050508 on Jul. 14, 2009, now Pat. No. 9,174,353.

(Continued)

(51) Int. Cl.
*B26D 7/08* (2006.01)
*B26F 1/38* (2006.01)
(Continued)

(52) U.S. Cl.
CPC .............. *B26D 7/08* (2013.01); *B26D 1/365* (2013.01); *B26D 7/00* (2013.01); *B26D 7/10* (2013.01); *B26F 1/384* (2013.01); *B31D 1/021* (2013.01); *B31D 1/026* (2013.01); *B32B 37/08* (2013.01); *B32B 38/0004* (2013.01);
(Continued)

(58) Field of Classification Search
CPC ...... B26D 1/365; B26D 7/08; B32B 38/0004; B32B 38/10; Y10T 156/1057; Y10T 156/1062; B26F 1/384
See application file for complete search history.

(56) References Cited

U.S. PATENT DOCUMENTS 2,303,346 A    12/1942  Flood
2,492,908 A    12/1949  Von Hofe
(Continued)

FOREIGN PATENT DOCUMENTS

EP    1798011    6/2007
EP    1837170    9/2007
(Continued)

OTHER PUBLICATIONS

"Controlling costs challenges label stock, liner suppliers," Paper, Film & Foil Converters, Jan. 1995. Retrieved from the Internet: ::<URL:http://pffc-online.com/ar/paper.sub.--controlling.sub.--costs.s- ub.--challege/index/htm.>.
(Continued)

*Primary Examiner* — Mark A Osele
*Assistant Examiner* — Christopher C Caillouet
(74) *Attorney, Agent, or Firm* — Avery Dennison Corporation (57) ABSTRACT

A method and apparatus are provided for die cutting label stock comprising a facestock, an adhesive and optionally a liner to form labels where a liner of the linered pressure sensitive adhesive label stock may be a thin or ultrathin liner.

20 Claims, 5 Drawing Sheets

Related U.S. Application Data (60) Provisional application No. 61/080,308, filed on Jul. 14, 2008.

(51) Int. Cl.

| | | |
|---|---|---|
| *B32B 38/04* | (2006.01) | |
| *B32B 38/10* | (2006.01) | |
| *B26D 7/10* | (2006.01) | |
| *B31D 1/02* | (2006.01) | |
| *B26D 7/00* | (2006.01) | |
| *B26D 1/36* | (2006.01) | |
| *B32B 37/08* | (2006.01) | |
| *B32B 38/00* | (2006.01) | |

(52) U.S. Cl.
CPC ........ *B32B 38/10* (2013.01); *B32B 2309/105* (2013.01); *Y10T 83/041* (2015.04); *Y10T 83/0443* (2015.04); *Y10T 83/0448* (2015.04); *Y10T 83/263* (2015.04); *Y10T 83/283* (2015.04); *Y10T 156/1994* (2015.01)

(56) References Cited

U.S. PATENT DOCUMENTS

| | | | |
|---|---|---|---|
| 3,565,750 A | 2/1971 | Evans | |
| 3,574,026 A | 4/1971 | Kucheck | |
| 3,686,980 A * | 8/1972 | Heyden | B26D 7/20 425/117 |
| 3,802,495 A | 4/1974 | Hordis | |
| 4,150,183 A | 4/1979 | Reed | |
| 4,279,682 A | 7/1981 | Hamagami et al. | |
| 4,400,230 A | 8/1983 | Wyslotsky | |
| 4,468,274 A | 8/1984 | Adachi | |
| 4,497,121 A * | 2/1985 | Choinski | B05C 9/14 34/445 |
| 4,625,612 A | 12/1986 | Oliver | |
| 4,945,709 A | 8/1990 | Cerf | |
| 4,978,415 A | 12/1990 | Jones | |
| 4,995,341 A * | 2/1991 | Matsuyama | C23C 16/54 118/718 |
| 5,076,612 A | 12/1991 | Nirmel | |
| 5,292,713 A | 3/1994 | Stenzel et al. | |
| 5,354,588 A | 10/1994 | Mitchell et al. | |
| 5,515,757 A | 5/1996 | O'Connor et al. | |
| 5,560,293 A | 10/1996 | Boreali et al. | |
| 5,567,260 A | 10/1996 | McFall | |
| 5,576,483 A | 11/1996 | Bonin | |
| 5,624,520 A | 4/1997 | Nedblake et al. | |
| 5,674,345 A | 10/1997 | Nash | |
| 5,776,289 A | 7/1998 | Steidinger | |
| 5,817,386 A | 10/1998 | Adamko et al. | |
| 6,106,492 A | 8/2000 | Darcey | |
| 6,187,128 B1 | 2/2001 | Oosterlinck | |
| 6,189,414 B1 | 2/2001 | Yoshizawa et al. | |
| 6,206,071 B1 | 3/2001 | Majkrzak et al. | |
| 6,210,524 B1 | 4/2001 | Josephy | |
| 6,230,597 B1 | 5/2001 | Baba et al. | |
| 6,261,252 B1 | 7/2001 | Darcey | |
| 6,294,038 B1 | 9/2001 | Majkrzak | |
| 6,571,983 B1 | 6/2003 | Schumann et al. | |
| 6,592,693 B1 | 7/2003 | Nedblake | |
| 6,652,172 B2 | 11/2003 | Wood et al. | |
| 6,694,872 B1 | 2/2004 | LaBelle et al. | |
| 6,695,501 B2 | 2/2004 | Nedblake et al. | |
| 6,743,469 B2 | 6/2004 | DiZio et al. | |
| 6,827,373 B2 | 12/2004 | Zumberge | |
| 7,000,522 B2 | 2/2006 | Pfaff et al. | |
| 7,070,727 B2 | 7/2006 | Calhoun et al. | |
| 7,556,708 B2 | 7/2009 | Phillips et al. | |
| 7,815,761 B2 | 10/2010 | Phillips | |
| 8,371,354 B2 | 2/2013 | Phillips | |
| 9,469,094 B2 | 10/2016 | Previty et al. | |
| 2001/0035257 A1 | 11/2001 | Fujii et al. | |
| 2002/0192548 A1 | 12/2002 | Schaefer et al. | |
| 2003/0089452 A1 | 5/2003 | Hansen et al. | |
| 2003/0150550 A1 | 8/2003 | Weirather et al. | |
| 2004/0161573 A1 | 8/2004 | Bethune | |
| 2005/0045005 A1 | 3/2005 | Hamilton et al. | |
| 2005/0051662 A1 | 3/2005 | Meyer et al. | |
| 2006/0233995 A1 | 10/2006 | Garland | |
| 2007/0017399 A1 | 1/2007 | Liguori et al. | |
| 2007/0163705 A1 | 7/2007 | Dollase et al. | |

FOREIGN PATENT DOCUMENTS

| | | |
|---|---|---|
| GB | 865165 | 4/1961 |
| JP | 63-161694 | 10/1988 |
| JP | 02-082499 | 6/1990 |
| JP | 06-66998 | 9/1994 |
| JP | 08-243997 | 9/1996 |
| JP | 09-254282 | 9/1997 |
| JP | 10-125354 | 5/1998 |
| JP | 11-254397 | 9/1999 |
| JP | 2001-038675 | 2/2001 |
| JP | 2003-205495 | 7/2003 |
| JP | 2004/010203 | 1/2004 |
| JP | 2005-052965 | 3/2005 |
| JP | 2005-178886 | 7/2005 |
| JP | 2008-012646 | 1/2008 |
| JP | 2008/150144 | 7/2008 |
| MX | PA04004644 | 5/2005 |
| WO | WO02/14069 | 2/2002 |

OTHER PUBLICATIONS

"Label adhesive," Packwood.com Apr. 2000, p. 82. Retrieved from the Internet:<URL:http://packworld.com/articles/Products/11407.html>.

Kaj Koskinen and Mikko Rissanen, "Cost savings through raw material efficiency," Label Papers for the World, UPM-Kymmen Label Papers Customer Magazine, Feb. 2001, pp. 8-11. Retrieved from the Internet:<URL:http://w3.1abel.upm-kymmene.com>.

Demand and Art. 34 Claim Amendments filed May 17, 2010 in corresponding International Application No. PCT/US2009/050508.

International Preliminary Report on Patentability issued Oct. 4, 2010 in corresponding International Application No. PCT/US2009/050508.

International Search Report and Written Opinion issued Feb. 11, 2010 in corresponding International Application No. PCT/US2009/050508.

Invitation to Pay Additional Fees issued Nov. 9, 2009 in corresponding International Application No. PCT/US2009/050508.

Response to Invitation to Pay Additional Fees filed Dec. 9, 2009 in corresponding International Application No. PCT/US2009/050508.

* cited by examiner

APPARATUS AND PROCESS FOR CUTTING ADHESIVE LABELS

CROSS REFERENCE TO RELATED APPLICATIONS

The present application is a continuation of U.S. patent application Ser. No. 13/003,771 filed Jul. 14, 2009, which is a 371 of IA No. PCT/US2009/050508 filed Jul. 14, 2009, which claims priority to U.S. Provisional Patent Application No. 61/080,308 filed Jul. 14, 2008, all of which incorporated herein by reference in their entireties.

FIELD OF THE INVENTION

This invention relates to the field of adhesive labels, and in particular, to an apparatus and method for die cutting adhesive labels, particularly pressure sensitive labels, wherein the label may or may not include a relatively thin protective liner on the adhesive.

DESCRIPTION OF THE RELATED ART

Typical labels, including pressure sensitive labels, are manufactured from label stock that comprises a face layer (facestock), an adhesive (i.e., PSA) layer adhered to the face layer and a protective release liner removably adhered to the adhesive layer. The label stock is generally provided in roll form. Individual labels may be produced by die cutting the face layer and the PSA layer, and then removing the surrounding waste matrix, leaving the individual labels adhered to the release liner. It is important that the release liner is not cut through during the die cutting operation. The use of heavy weight liners helps to prevent the liner from being completely cut through. However, heavy weight liners are costly and ultimately produces a waste product. Thin, light weight release liners are useful for lowering operational costs, but there are limitations to the use of thin liners, particularly for various high speed die cutting processes. Typical manufacturing processes for labels are run at speeds of at least 100 ft/min (28.6 m/min), and preferably at least 400 ft/min (113.6 m/min) or higher. As the speed increases, the process becomes less stable and the die cutting becomes less accurate. The likelihood of cutting through the liner and of the liner wrinkling or becoming distorted is increased as the thickness of the liner decreases. Slowing the process down to avoid cutting through the thin liner, however, results in a significant cost disadvantage, a loss of efficiency, and may frequently be ineffective.

One method of accommodating thin liners involves removing the thin, light weight liner from the adhesive layer label stock and applying a temporary reusable support to the adhesive. The face layer and adhesive layer may then be die cut into individual labels, and after delivery of the labels to the label application operation, the temporary support can be wound up and reused.

In another method, a thin, light weight liner is delaminated from the adhesive backed face layer, the face layer and adhesive layer are then cut into labels, and the labels are relaminated to the light weight liner. The labels may or may not be connected to the waste matrix when they are relaminated to the liner. Difficulties often arise when performing various operations, including label cutting, on webs having their liner separated from the face and adhesive or on linerless label stock due to the tackiness of the PSA layer.

BRIEF SUMMARY OF THE INVENTION

In one aspect of the invention there is provided a method of forming a cut adhesive backed label on a liner from a web of label stock comprising a facestock having a first side and a second side, an adhesive layer adhered to a first side of the facestock and, optionally, a release liner adhered an exposed surface of the adhesive layer. The web of label stock is fed to a separator station, where the separator separates the liner from the facestock and adhesive layer. When the liner is not present, or the liner has been separated from the facestock, the facestock and adhesive layer are fed to a cutting station to form a plurality of cut adhesive backed labels and a surrounding matrix. The cutting station comprises a flexible rotary die and an anvil roller where the flexible rotary die comprises a die plate that is fastened to a mounting cylinder, where the adhesive is cooled prior to entering the cutting station or the flexible rotary die is chilled, or a combination of both, where the cooling is to a such a degree so as to reduce the tack of the adhesive. When a release liner is present, relaminating the previously removed release liner to the cut adhesive backed labels and matrix or, optionally, laminating a new release liner to the cut adhesive backed labels.

In one embodiment, the surrounding matrix is stripped from the cut labels after a liner is laminated to the cut labels and matrix. The cut labels and liner are wound onto a roll.

In another embodiment, a solid material fills an air gap formed between the die plate, which is magnetically fastened to a magnetic mounting cylinder wherein the solid material has a greater thermal conductivity than air. The flexible rotary die comprises an engineered interior that allows sufficient heat exchange at the surface of the rotary die. The flexible rotary die comprises a cooling system and a coolant. The flexible rotary die is cooled to the dew point to allow condensation to build up on the die. The cutting station comprises a walking beam assembly.

In another embodiment, the adhesive layer is cooled by passing the facestock and the adhesive layer through a chilling zone after the liner, if present, has been separated from the web of label stock and prior to feeding the facestock and the adhesive layer to the cutting station. The die is lubricated with a lubricant. The web tension of the facestock and adhesive layer is controlled with an electrostatic charge after the liner, if present, has been separated from the web of label stock and prior to relaminating the removed release liner, or laminating a new release line, to the cut adhesive backed labels and matrix. The release liner, if present, has a thickness of less than 1.2 mils (0.030 mm).

In another aspect of the invention, there is provided a method of forming a cut adhesive backed label on a liner, comprising a web of label stock comprising a facestock having a first side and a second side, an adhesive layer adhered to a first side of the facestock and, optionally, a release liner adhered an exposed surface of the adhesive layer. When a liner is present, the web of label stock is fed to a separator station, wherein the separator separates the liner from the facestock and adhesive layer. When a liner is not present or following separation of the liner from the facestock when present, the facestock and adhesive layer are fed to a cutting station comprising a die and an anvil in an orientation such that the adhesive of the adhesive layer contacts the die wherein a plurality of cut adhesive backed labels and a surrounding matrix is formed, where the cutting surface of the die is lubricated with a lubricant. When a release liner is present, relaminating the previously removed release liner to the cut adhesive backed labels and matrix or, optionally, laminating a new release liner to the cut adhesive backed labels.

In one embodiment, the die is a rotary die and the cutting surface of the rotary die is lubricated using a flexographic printing plate cylinder. The die is coated with a material which prevents the adhesive of the adhesive layer from adhering to the die.

In another aspect of the invention, there is provided a method of forming a cut adhesive backed label on a liner, comprising providing a web of label stock comprising a facestock, a pressure sensitive adhesive layer adhered to the facestock and a release liner adhered to the adhesive layer, feeding the web of label stock to a cutting station to form a plurality of cut adhesive backed labels and a surrounding matrix on the release liner, wherein the cutting station comprises a die and an anvil, and the anvil comprises an elastic, polymeric material, stripping the matrix from the cut adhesive backed labels and matrix on the liner; and winding the cut adhesive backed labels on the liner into a roll. The distance between the die and the anvil is controlled to prevent cutting the release liner.

In another aspect of the invention, there is provided a method of forming a cut adhesive backed label on a liner, providing a web of label stock comprising a facestock, a pressure sensitive adhesive layer adhered to the facestock and a release liner adhered to the adhesive layer, feeding the web of label stock to a cutting station to form a plurality of cut adhesive backed labels and a surrounding matrix on the release liner, wherein the cutting station comprises a die and an anvil, and the die is a rotary die and a die bridge provides an automatic adjustment of the force applied to each side of the die to a set point force, stripping the matrix from the cut adhesive backed labels and matrix on the liner, and winding the cut adhesive backed labels on the liner into a roll.

In yet another aspect of the invention, there is provided a method of forming a cut adhesive backed label on a liner, providing a web of label stock comprising a facestock, a pressure sensitive adhesive layer adhered to the facestock and a release liner adhered to the adhesive layer, feeding the web of label stock to a cutting station to form a plurality of cut adhesive backed labels and a surrounding matrix on the release liner, wherein the cutting station comprises a die and an anvil, and the distance between the die and the anvil is controlled to prevent cutting the release liner, stripping the matrix from the cut adhesive backed labels and matrix on the liner, and winding the cut adhesive backed labels on the liner into a roll. The distance between the die and the anvil is controlled with an electrostatic controller.

In another aspect of the invention, there is provided an apparatus for forming a cut adhesive backed label on a liner comprising a separator station for separating a liner from a facestock and adhesive layer and a cutting station for forming a plurality of cut adhesive backed labels and a surrounding matrix from the facestock and the adhesive layer, wherein the cutting station comprises a flexible rotary die and an anvil wherein the flexible rotary die comprises a die plate that is fastened to a mounting cylinder, and a means for cooling the adhesive prior to cutting the facestock and adhesive. The laminator is oriented for relaminating the release liner to the cut adhesive backed labels and matrix. A stripper is oriented for stripping the matrix from the cut adhesive backed labels and matrix on the liner.

In one embodiment, there is provided a means for winding the cut adhesive backed labels on the liner into a roll.

In a further embodiment, the apparatus comprises a solid material fills an air gap formed between the die plate, which is mechanically fastened to the mounting cylinder, and the magnetic mounting cylinder wherein the solid material has a greater thermal conductivity than air.

In a further embodiment, the apparatus comprises a lubricator, which further comprises a flexographic printing plate. The anvil is an elastic polymeric anvil.

In a further embodiment, the apparatus comprises a means to control the distance between the die and anvil to prevent cutting the release.

DETAILED DESCRIPTION

The present invention provides a method and apparatus for die cutting label stock to form labels. In several embodiments a method and apparatus are provided for die cutting linered or linerless label stock to form labels where the label stock is die cut without a liner. In other embodiments a method and apparatus are provided for die cutting linered label stock to form labels where the label stock is die cut with a liner. Label stock normally includes a polymeric facestock which can carry information such as printed information, an adhesive layer such as a pressure sensitive adhesive layer adhered to the facestock, and in the instance of linered label stock a release liner releasably adhered to the adhesive layer. Die cutting of the label stock to form labels involves cutting through the facestock and the adhesive layer. The present invention provides a method and apparatus to die cut label stock with an exposed adhesive when no liner is present or to die cut label stock with a liner, and in particular a thin liner having a thickness of 1.2 mils or less (0.030 millimeters/mm or less).

In one embodiment, the label stock comprises a facestock, and a pressure sensitive adhesive layer adhered to the facestock (together defining the "face web") and a release liner removably or releasably adhered to the adhesive layer. The method comprises separating the release liner from the face web, chilling the pressure sensitive adhesive layer, cutting the face web into individual labels in a matrix, relaminating the release liner to the cut labels, and then stripping the matrix from the construction. The method comprises the step of chilling the pressure sensitive adhesive (PSA) to sufficiently reduce its tack, allowing the cutting surface of the die to contact the PSA without the adhesive adhering to the cutting surface.

Label Stock

The label constructions useful in the present invention comprise a facestock, a release liner, and an adhesive layer between the facestock and the liner. The facestock that is used in the label constructions may comprise any of a variety of materials known to those skilled in the art to be suitable as a facestock material. For example, the facestock may be comprised of such materials as paper (e.g., kraft, bond, offset, litho and sulfite paper) with or without sizing, or polymeric materials suitable for facestock use such as polyolefins, polyesters, polyamides, etc. In one embodiment, the requirement for the facestock material is that it be capable of forming some degree of adhesive bond to an adhesive layer. In one embodiment, the facestock comprises a polymeric film which can form the desired bond and which is capable of being printed. In yet another embodiment, the polymeric film material is one that, when combined with the adhesive layer, provides a sufficiently self-supporting construction to facilitate label dispensing (label separation and application). The surfaces of the facestock material can be surface treated, to include for example corona treated or flame treated or top coat treated, to improve performance in various areas such as printability and/or adhesion to the adhesive layer in contact therewith. Preferably the polymer film material is chosen to provide the label construction with one or more of the desired properties such as printability, die-cuttability, matrix-strippability, dispensability, etc.

The facestock may be a monolayer polymeric film facestock or it may comprise more than one polymer film layer, some of which may be separated by an internal adhesive layer. The thicknesses of each of the layers may be varied. Multilayer film facestocks may be prepared by techniques well known to those skilled in the art such as by laminating two or more preformed polymeric films (and, optionally an adhesive layer) together, or by the coextrusion of several polymeric films and, optionally, an adhesive layer. The multilayer facestocks may be prepared also by sequential coating and formation of individual layers, triple die coating, extrusion coating of multiple layers onto an adhesive layer, etc.

The label constructions also include an adhesive layer having an upper surface and a lower surface wherein the upper surface of the adhesive layer is adhesively joined or adhered to the lower surface of the facestock. In some embodiments, as noted above, the constructions also contain an interior adhesive which can function as a lamination adhesive when laminating preformed polymeric films together to form a facestock. The internal adhesives may be a heat-activated adhesives, hot melt adhesives, or pressure sensitive adhesives (PSA). The external (adhered to the facestock) adhesive is preferably a PSA. Adhesives that are tacky at any temperature up to about 160° C. (about 320° F.) are particularly useful. PSAs that are tacky at ambient temperatures are particularly useful in the adhesive constructions of the present invention. Ambient temperatures include room temperature and can range from 5 to 80° C., 10 to 70° C., or 15 to 60° C.

The adhesives may generally be classified into the following categories: random copolymer adhesives such as those based upon acrylate and/or methacrylate copolymers, a-olefin copolymers, silicone copolymers, chloroprene/acrylonitrile copolymers, and the like; and block copolymer adhesives including those based upon linear block copolymers (i.e., A-8 and A-B-A type), branched block copolymers, star block copolymers, grafted or radial block copolymers, and the like, and Natural and synthetic rubber adhesives. In an embodiment the adhesive of the adhesive layer is an emulsion acrylic-based pressure sensitive adhesive.

A description of useful pressure-sensitive adhesives may be found in Encyclopedia of Polymer Science and Engineering, Vol. 13. Wiley-Interscience Publishers (New York, 1988). Additional description of useful pressure-sensitive adhesives may be found in Encyclopedia of Polymer Science and Technology, Vol. 1, Interscience Publishers (New York, 1964).

The label stock may comprise a heavy weight liner or a thin, light weight liner. The thickness of the thin liner is less than the standard 2.5 mils (0.064 mm) The thickness of the liner may be less than 2.2 mils (0.060 mm), less than 2.0 mils (0.051 mm), less than 1.8 mils (0.042 mm), or less than 1.2 mils (0.030 mm).

In one embodiment, the liner is an ultrathin or ultra light liner having a thickness of less than 1.02 mil (0.0254 mm), less than 1 mil (0.0254 mm), less than 0.92 mil (0.0233 mm), less than 0.8 mil (0.0203 mm), less than 0.6 mil (0.017 mm), less than 0.50 mil (0.013 mm), or equal to or less than 0.25 mil (0.00626 mm). Such thin liners are commercially available as Hostaphan® polyester film (e.g., 0.5 mil, 0.0127 mm, Tradename 2SLK silicone coated film) sheeting from Mitsubishi Chemical Company. Another liner material is provided by Avery Dennison as a 1.02 mil (0.026 mm) polyester backing sheet with a 1.25 mil (0.032 mm) adhesive layer.

In another embodiment, the label stock or web of label stock is linerless and comprises a facestock and a pressure sensitive adhesive layer adhered to the facestock, with no release liner adhered to the adhesive layer. The linerless label stock consists essentially of a facestock and a pressure sensitive adhesive layer adhered to one side of the facestock and a release coating on the other side of the facestock.

Method of Die Cutting Label Stock

Figure 1:
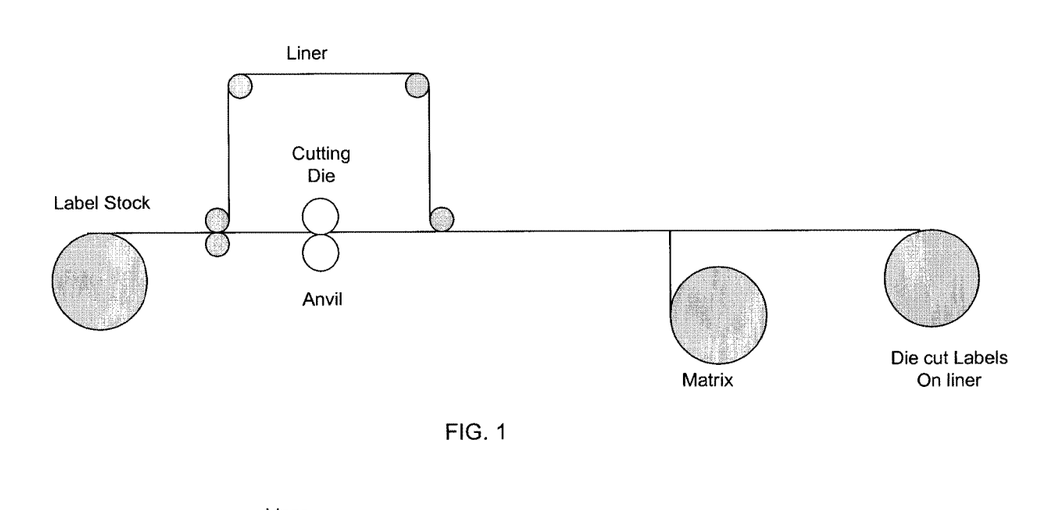
FIG. 1 is a schematic of a label converting process that includes the operations of delamination, cutting, relamination and matrix stripping.

The process or method of forming a cut label, in one embodiment illustrated in FIG. 1, comprises providing a label stock that includes a facestock and an adhesive layer adhered to the facestock (together defining the "face web") and a release liner removably adhered to the adhesive layer; delaminating the release liner from the face web; cooling the adhesive layer to reduce the tack of the adhesive; die cutting the label material to form individual labels; and relaminating the release liner to the adhesive layer of the cut labels. After the face web is die cut, the liner is relaminated to the face web. The waste matrix is stripped from the web and the die cut labels on the liner are wound into a roll.

Figure 2:
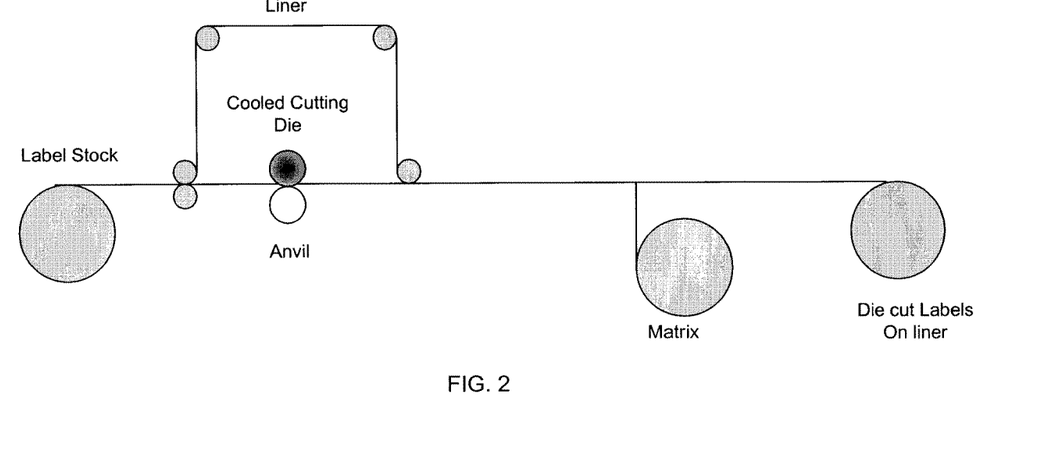
FIG. 2 is a schematic of a label converting process that includes cooling the adhesive layer with a cooled cutting die.

In one embodiment, illustrated in FIG. 2, the adhesive is cooled at the cutting station. A cylindrical rotary die may be used to cool and cut the face web after the liner has been separated from the face web. The adhesive layer directly contacts the cooled die. The rotary die may include an engineered interior that provides for a series of rifling lines, spirals, honeycombs, baffles or other structure to allow sufficient heat exchanging at the surface of the die for the type of adhesive used, ambient environment and speed of cutting in order to reduce the tack of the adhesive, with minimal buildup of frost. The adhesive is cooled to allow the cutting surfaces of the die to come into contact with the pressure sensitive adhesive without the adhesive adhering to the cutting surfaces. This reduction in adhesiveness reduces buildup on\ the die of the adhesive and of other matter that accumulates on the residual adhesive. After the face web is die cut, the liner is relaminated to the face web. The waste matrix is stripped from the web and the die cut labels on the liner are wound into a roll.

In an embodiment, as depicted in FIG. 2, a method of forming a cut adhesive backed label on a liner comprises providing a web of label stock comprising a facestock, a pressure sensitive adhesive layer adhered to the facestock and a release liner adhered to the adhesive layer; feeding the web of label stock to a separator station, where the separator separates the liner from the facestock and adhesive layer; feeding the facestock and adhesive layer to a cutting station to form a plurality of cut adhesive backed labels and a surrounding matrix, where the cutting station comprises a flexible rotary die and an anvil roller where the flexible rotary die comprises a die plate that is mechanically fastened to a mounting cylinder, and adhesive of the adhesive layer is cooled at the cutting station to reduce tack of the adhesive where the adhesive contacts the die which is cooled; laminating the release liner to the cut adhesive backed labels and matrix; stripping the matrix from the cut adhesive backed labels and matrix on the liner; and winding the cut adhesive backed labels on the liner into a roll. The die plate of the flexible rotary die can be mechanically fastened to the mounting cylinder in any fashion to include in the form of pins which extend from the base of the back side of the die plate to an appropriate depth, to include nominally ⅛ to ¼ inch (3.2 to 6.4 mm), and are mechanically held in bores which are drilled in the mounting cylinder to match the position of the pins in the die plate. The bores and pins are constructed in a manner so that the pins are mechanically held in the bores. For example, after mounting the flexible plate onto the magnetic cylinder a mechanical collar fitted to a corresponding pin around the base cylinder is tightened to hold the pin in its inserted position. The method may include using a series of air bladders around each collar which, when inflated, positions the collar into keyways located along the pin's surface. Alternatively, similarly constructed collars may be associated with a screw mechanism that is tightened perpendicular to the pin at the face plate at the flat end or ends of the base cylinder. Alternatively screws may be used, with or without pins, to secure the flexible plate to the base wherein the screws are placed in areas representing the matrix or cavity of the cutting edge. Alternatively a surface locking mechanism similar to that described by U.S. Pat. No. 7,000,522 [Eagle Rotary Systems, Inc.] may be used to secure the corners of a flexible die to the base.

In an embodiment a solid material fills an air gap formed between the die plate and the mounting cylinder where the solid material has a greater thermal conductivity than air. The thermal conductivity of a substance is a physical property and indicates the ability of the substance to conduct heat. In general thermal conductivities of substances increase as densities of substances increase so normally solid materials have greater thermal conductivities than gases such as air. The solid material can comprise any material that has a greater thermal conductivity than air and thus allows the die plate to reach a reduced temperature at which the tack of adhesive of the adhesive layer is reduced and buildup of adhesive on the rotary die is minimized or prevented. The solid material can be in any form that fills the air gap to include a film such as for example a paper film or a plastic film, a film coated with an adhesive such as for example a pressure sensitive adhesive, or a liquid coating such as for example where the coating comprises at least one polymer in a volatile solvent and where the coating is sprayed or brushed or otherwise applied to the back side of the die plate. In an embodiment the mounting cylinder is a magnetic mounting cylinder where the die plate is held in place on the magnetic mounting cylinder by a magnetic force. In an embodiment the flexible rotary die comprises an engineered interior that allows sufficient heat exchange at the surface of the rotary die. In an embodiment the flexible rotary die comprises a cooling system and a coolant where the cooling system comprises a cavity through which a refrigerated coolant is circulated or pumped in order to reduce the temperature of the die where the adhesive contacts the die. The reduced temperature of the die reduces the tack of the contacting adhesive. The reduced temperature of the die can result in a build up of frost on the die where the adhesive contacts the die which also reduces the tack of the contacting adhesive. Since frost can also build up on the flexible rotary die between the die plate and the magnetic mounting cylinder resulting in movement to include slipping or skewing or dislodging of the die plate from the magnetic mounting cylinder when held in place only by a magnetic force, mechanically fastening the die plate to the magnetic mounting cylinder prevents these die plate movements. In an embodiment the flexible rotary die is cooled to the dew point, as described hereinbelow, to allow condensation to build up on the die where the condensation forms a self-sustaining lubrication mechanism. Dew point is defined as the temperature at which a vapor begins to condense as a liquid and in the present invention is the temperature at which ambient or atmospheric water vapor begins to condense as a liquid or condensation. In an embodiment the cutting station comprises the above described chilled flexible rotary die and a roller where the roller removes excess build up of material on the die where the material can include frost or water condensation. In an embodiment the cutting station comprises the above described flexible rotary die and a walking beam assembly as described hereinbelow where the walking beam assembly provides increased cooling time. In an embodiment the cutting station comprises the above described flexible rotary die where an electrostatic charge is applied to the adhesive layer prior to laminating the release liner to the cut adhesive backed labels and matrix. The application of a surface treatment to the exposed adhesive layer, where the surface treatment can include an electrostatic charging or a corona treatment or a flame treatment, prior to laminating the release liner to the cut adhesive backed labels and matrix enhances wet out of the adhesive layer to the release liner for the purpose of facilitating a high speed in-line stripping or removal of the matrix without lifting of the cut adhesive backed labels from the release liner. In an embodiment the adhesive layer is cooled by passing the facestock and the adhesive layer through a chilling zone, as described hereinbelow, after the liner has been separated from the facestock and the adhesive layer and prior to feeding the facestock and the adhesive layer to the cutting station that comprises the flexible rotary die. In an embodiment the above described flexible rotary die is lubricated, as described hereinbelow, with a lubricant where the lubricant reduces or prevents the build up of adhesive on the die. In an embodiment web tension of the facestock and adhesive layer is controlled with an electrostatic charge after the liner has been separated from the facestock and adhesive layer and prior to laminating the release liner to the cut adhesive backed labels and matrix where the cut adhesive backed labels and matrix are formed at a cutting station comprising the above described flexible rotary die. The web tension is controlled by using an electrostatic charge to pin or hold a web to a driven roller in a roll fed converting process for the purposes of creating an isolation point and web tension zone without use of a nip roll or vacuum roll, and stabilizing and transporting an unsupported/linerless die cut web, to include a die cut web of cut adhesive backed labels and matrix from a web of label stock or a web of label stock that is linerless where the facestock has a pressure sensitive adhesive layer on one side of the facestock and a release coating on the other side of the facestock, while in contact with the driven roller. The electrostatic charge can be applied to the web at its first point of contact with the driven roller as the web is moving which results in a slip resistant affinity between the web and the driven roller where the strength of the affinity depends on the charge applied, the dielectric properties of the web being charged, the materials used in the fabrication of the driven roller, and the degree of wrap on the driven roller after the initial electrostatic pinning to the driven roller. The process of electrostatic pinning of a web to a driven roller provides a method to handle and control tension of a web having exposed pressure sensitive adhesive without directly contacting the exposed adhesive. In an embodiment the above described method of forming a cut adhesive backed label on a liner, comprising a cutting station that comprises a flexible rotary die, comprises thin and ultrathin release liners to include release liners, as described hereinabove, having a thickness of less than 1.2 mils (0.030 mm). In an embodiment the above described method of forming a cut adhesive backed label on a liner, comprising a cutting station that comprises a flexible rotary die, comprises the web of label stock where the web of label stock is linerless, as described above, and consists essentially of a facestock and a pressure sensitive adhesive layer adhered to one side of the facestock and a release coating on the other side of the facestock, the liner separation step is excluded, and the lamination step involves laminating the cut adhesive backed labels and matrix to a release liner where the release liner can be a temporary and/or reusable release liner. The embodiments described throughout this application for a method of forming or an apparatus for forming a cut adhesive backed label on a liner, where an adhesive layer is exposed in the method or apparatus, are useful individually and in combinations of two or more.

Figure 3:
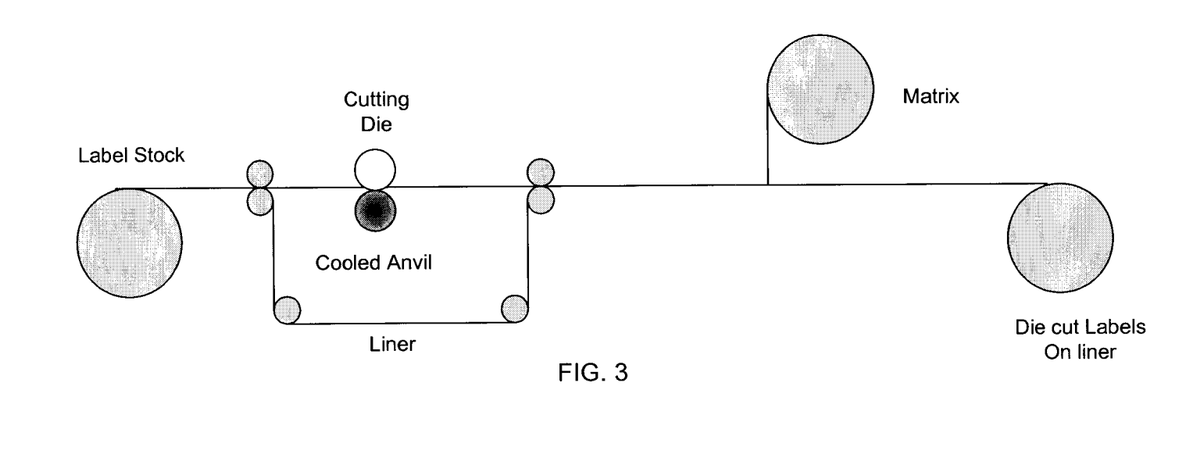
FIG. 3 is a schematic of a label converting process that includes cooling the adhesive layer with a cooled anvil roller.

In another embodiment illustrated in FIG. 3, a chilled anvil roller may be used to cool the adhesive. The adhesive layer, in this embodiment, contacts the chilled anvil and the face material initially contacts the die. The chilled anvil may be constructed to include a series of rifling lines, spirals, honeycombs, baffles or other structure to allow sufficient heat exchanging at the surface of the anvil for the type of adhesive used, ambient environment and speed of cutting in order to reduce the tack of the adhesive, with minimal buildup of frost. After the face web is die cut, the liner is relaminated to the face web. The waste matrix is stripped from the web and the die cut labels on the liner are wound into a roll.

In yet another embodiment, a flat die, rather than a rotary die is used. Such dies include engraved dies, sheer edge dies, steel rule dies and other constructions known in the art. The upper, non-cutting surface of the die may have incorporated therein rifling lines, honeycombs, baffles, or other structures to allow sufficient heat exchanging at the surface of the die for the type of adhesive used, ambient environment and speed of cutting in order to reduce the tack of the adhesive, with minimal buildup of frost.

Figure 4:
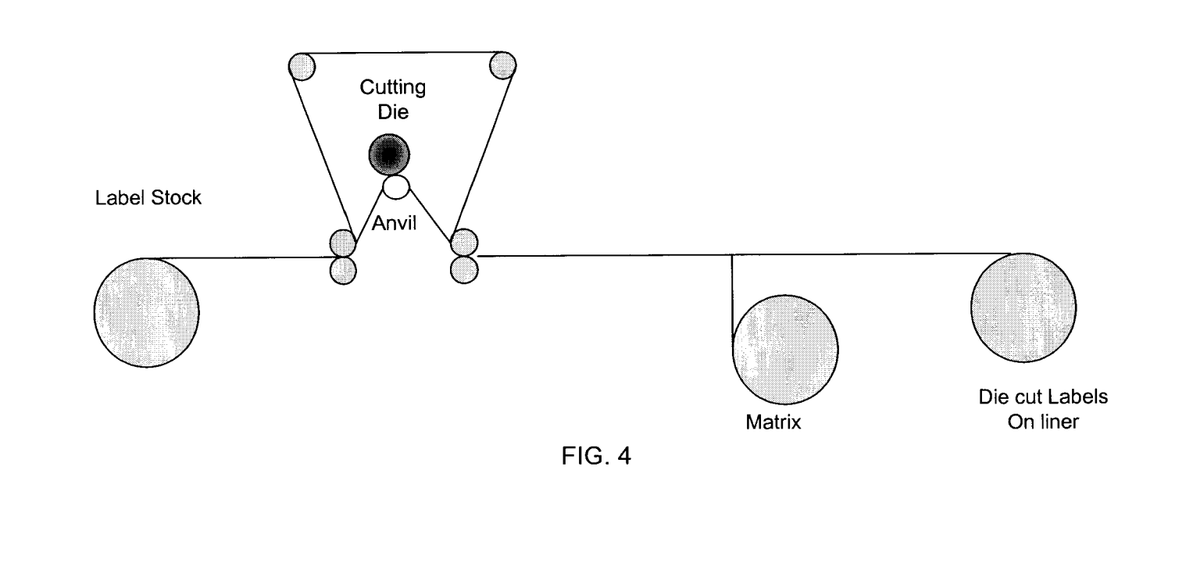
FIG. 4 is a schematic of a label converting process that includes cooling the adhesive layer and cutting the web with a walking beam.

A walking beam assembly may be used to provide increased cooling time between the cooled die and the adhesive and higher line speed while die cutting. The walking beam may have lateral and vertical motion similar to a tank thread system, incorporating a plurality of die cutting modules that are linearly synchronous to the web material during the cutting cycle. Alternatively, the walking beam may comprise a single cutting unit in an orbital motion. In one embodiment, illustrated in FIG. 4, a small diameter anvil, or "micro anvil" is used in place of a conventional anvil.

Figure 5:
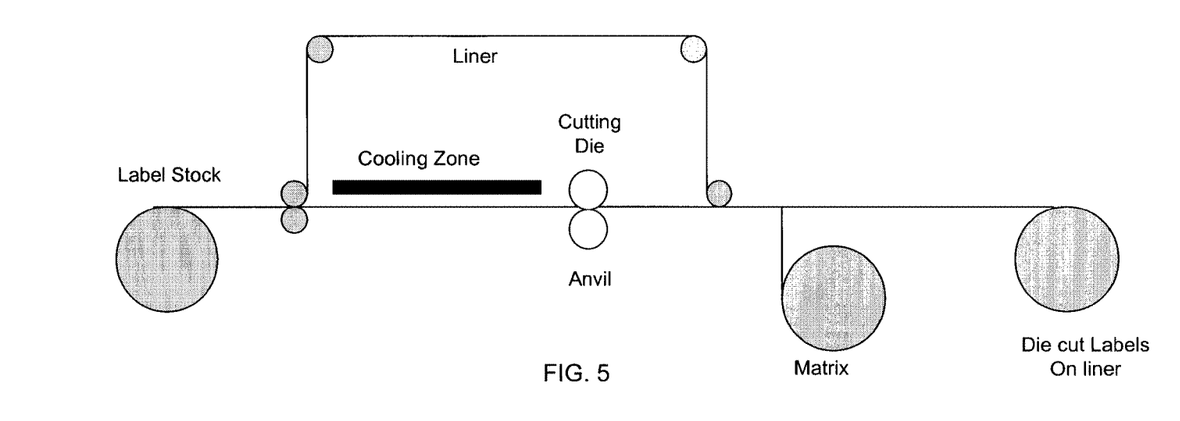
FIG. 5 is a schematic of a label converting process that includes cooling the adhesive layer prior to cutting.

In the embodiment illustrated in FIG. 5, the adhesive layer is cooled by passing the face web through a chilling zone or zones after the liner has been delaminated and prior to contact with the die. The apparatus and method may utilize one or more venturi systems to reduce air temperature and cool the adhesive to a temperature where it is no longer tacky. Once the adhesive is cooled to the proper temperature, the cooled web enters a die cutting station where a standard or cooled rotary die or flatbed die cuts the individual labels. The cooling of the adhesive is dependent on the amount of time the adhesive is in the cooling zone and the temperature provided by the venturi. After the labels are cut in the label material, the label material is reunited with the release liner at a relamination unit. Following relamination of the release liner, the waste matrix may be stripped from the label material and the cut labels adhered to the release liner may be wound into a roll.

The venturi system may be configured such that the cooling zone is warmed to provide a frost-free system to avoid the build-up of ice within the cooling zone. In one embodiment, the venturi system is provided with a dehumidifier or inert environment, for example from a nitrogen blanket, to maintain a low level of humidity in the cooling zone.

The cooling system may use a liquid coolant, including such as for example a silicon or silicone oil or an alcohol or a glycol or water or a mixture of two or more liquid coolants, to provide heat removal. A cooling system that includes another type of heat exchanger may be provided to transform the adhesive from a tacky state to a non-tacky state.

Figure 6:
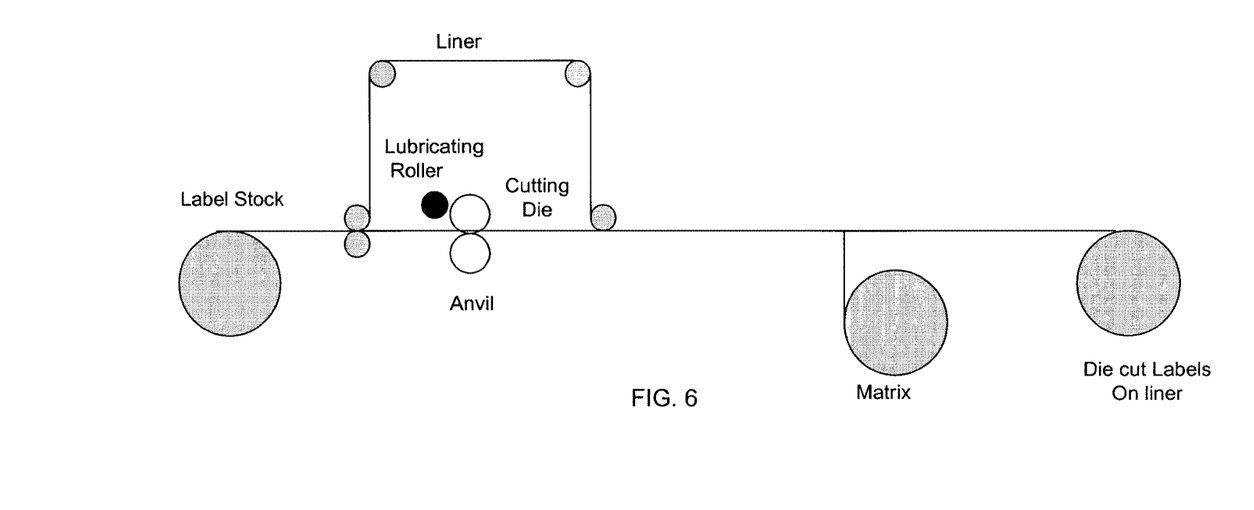
FIG. 6 is a schematic of a label converting process that includes lubricating the cutting die.

To reduce the likelihood of the adhesive to build up on the die cutter, a lubricant may be applied to the die surface. FIG. 6 illustrates a process wherein a lubricant is applied to the cutting die with a roller. Useful lubricants include any lubricant that reduces or minimizes or prevents the build up of adhesive on the die. Suitable lubricants include, but are not limited to water, fatty acid or fatty acid salt containing compositions such as for example compositions containing stearates, aqueous surfactant solutions such as for example soapy solutions containing a metal salt of a fatty acid or of an alkylated arenesulfonic acid, liquid silicones, plasticizers such as for example fatty acid esters and hydrocarbon oils, fatty alcohols such as for example 1-decanol, undried emulsion pressure sensitive adhesives such as for example undried emulsion acrylic pressure sensitive adhesives, non-silicon containing lubricants and the like, and mixtures of two or more lubricants. The lubricant may be applied to the cutting surface by spray, roller, sponge, electrostatics, ink jet or other method that provides for the minimum amount necessary to prevent the adhesive from building up given the ambient environment, process speed and adhesive type.

In an embodiment, as depicted in FIG. 6, a method of forming a cut adhesive backed label on a liner comprises providing a web of label stock comprising a facestock, a pressure sensitive adhesive layer adhered to the facestock and a release liner adhered to the adhesive layer; feeding the web of label stock to a separator station, where the separator separates the liner from the facestock and adhesive layer; feeding the facestock and adhesive layer to a cutting station to form a plurality of cut adhesive backed labels and a surrounding matrix, where the cutting station comprises a die and an anvil, the cutting surface of the die is lubricated with a lubricant using a flexographic printing plate, and adhesive of the adhesive layer contacts the die; laminating the release liner to the cut adhesive backed labels and matrix; stripping the matrix from the cut adhesive backed labels and matrix on the liner; and winding the cut adhesive backed labels on the liner into a roll. As described above lubrication of a die with a lubricant reduces or prevents the build up of adhesive on the die. Using a flexographic printing plate to lubricate the cutting surface of a die with a lubricant allows for a controlled application of the lubricant to the knife tip or cutting edge of the die and is a relatively simple, reliable, highly consistent, and efficient process. The elevated surfaces of the flexographic printing plate are designed to match the pattern of the knife tip or cutting edge of the die. The lubricant can be transferred from the elevated surfaces of the flexographic printing plate to the cutting edge of the die in any fashion to include by electrostatic charging and/or surface retraction properties of the elevated surfaces of the flexographic printing plate and the surface retention properties of the cutting edge of the die. In an embodiment the die is a rotary die or a flexible rotary die and the cutting surface of the rotary die or flexible rotary die is lubricated using a flexographic printing plate cylinder. In an embodiment where the die is lubricated with a flexographic printing plate or flexographic printing plate cylinder, the die body of the die has a coating where the coating prevents adhesive of the adhesive layer from adhering to the die body. The coating of the die body can be any coating that reduces or minimizes or prevents adhesive from adhering to the die body to include for example fluorinated polymers where the coating can be applied to the die body in any fashion to include for example by various vacuum deposition methods including electrostatic assisted methods. The die body generally includes the noncutting outer surface of the die. In an embodiment the outer surface of die, to include the die body and the cutting edge of the die, has a coating where the coating prevents adhesive of the adhesive layer from adhering to the die. In an embodiment where the die is lubricated with a flexographic printing plate or flexographic printing plate cylinder, the web of label stock is linerless and consists essentially of a facestock and a pressure sensitive adhesive layer adhered to one side of the facestock and a release coating on the other side of the facestock, the liner separation step is excluded, and the lamination step involves laminating the cut adhesive backed labels and matrix to a release liner where the release liner can be a temporary and/or reusable release liner.

Figure 7:
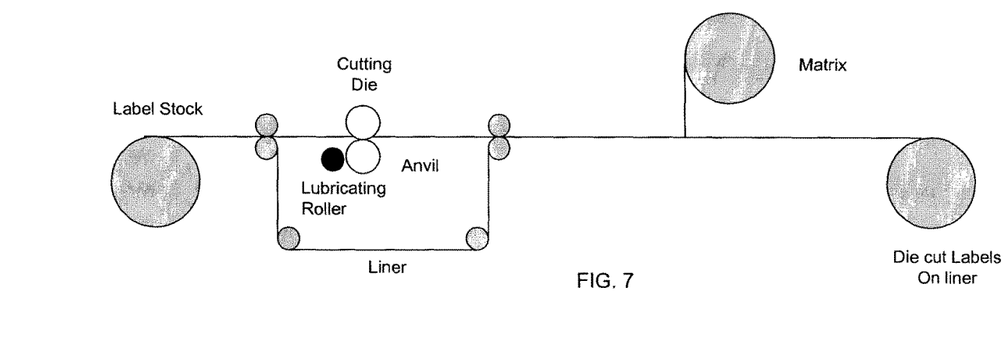
FIG. 7 is a schematic of a label converting process that includes lubricating the anvil.

Alternatively, a lubricant may also be applied to the anvil, as illustrated in FIG. 7. Lubrication of the die and/or anvil may be used in combination with a cooled die or cooled anvil.

In one embodiment, a coolant is used to bring the die to approximately dew point, allowing condensation to build up on the surface of the die. This condensation forms a self-sustaining lubrication mechanism. A suitable control system may be included to maintain a narrow surface temperature range through the use of rifling, spirals, honeycombs, baffles and other internal surfaces of the die. The cooling system may be used in combination with temperature and humidity sensors that monitor heat buildup and other process conditions necessary to maintain a minimal surface condensation.

Figure 8:
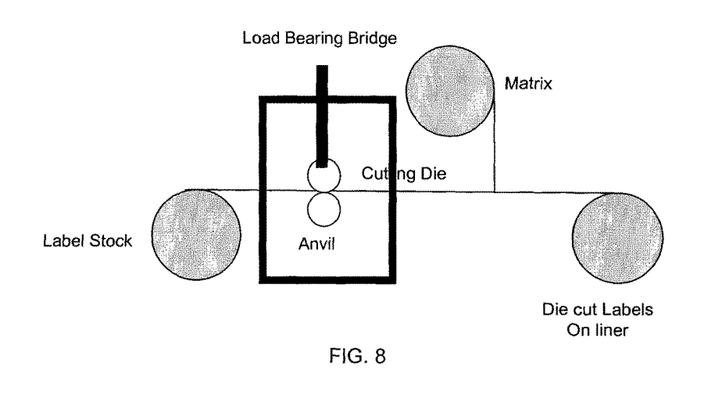
FIG. 8 is a schematic of a label converting process that includes die cutting the face web as it is adhered to a liner.
Figure 9:
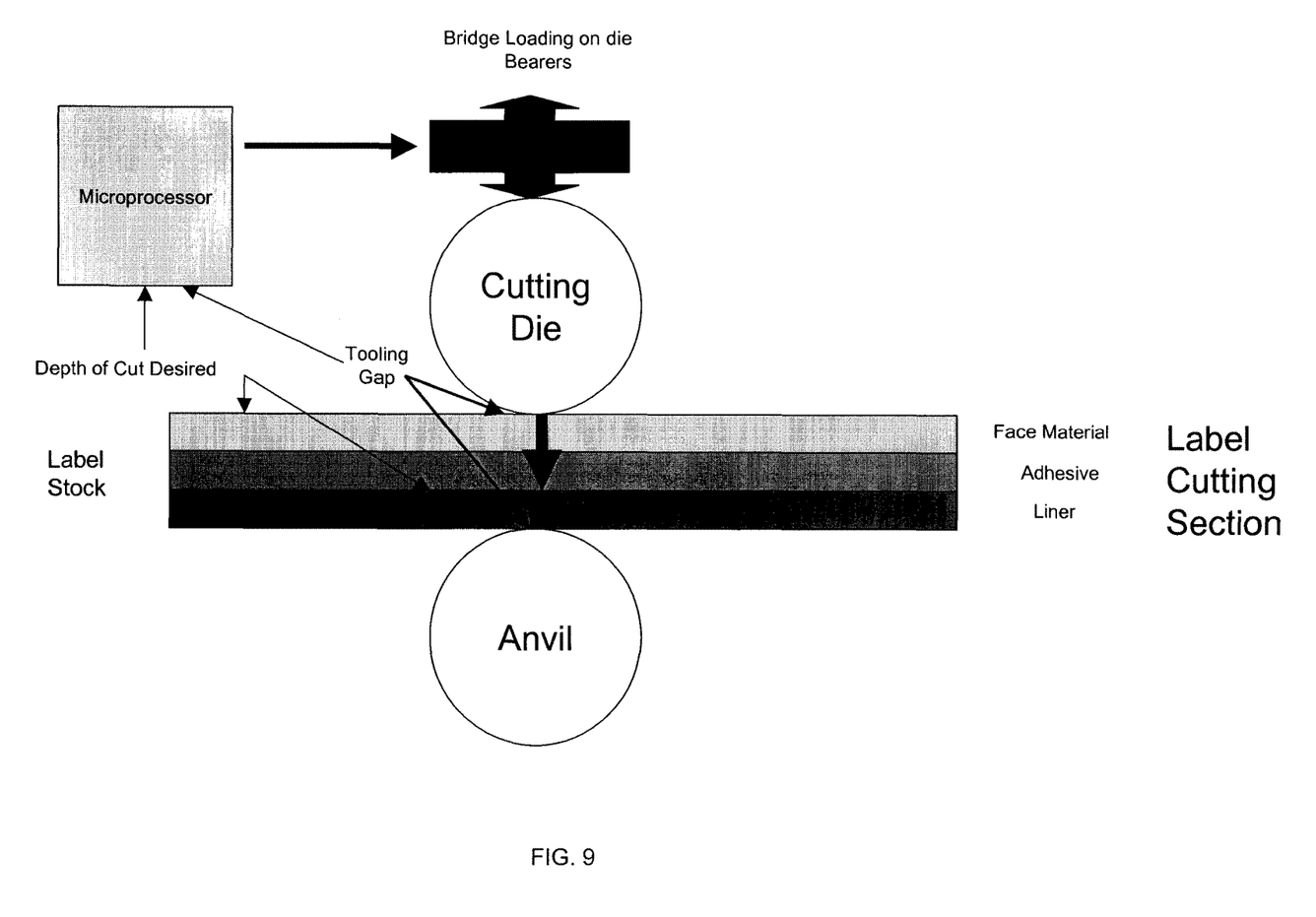
FIG. 9 is a schematic of a process for die cutting a face web using an electrostatically controlled die.

In one embodiment of the invention, there is provided a process for die cutting labelstock adhered to a liner to include a thin or ultrathin liner without the need to delaminate and relaminate the liner. As illustrated in FIGS. 8 and 9, the labelstock is die cut against the liner, to include a thin or ultrathin liner, without through cutting or cutting through cutting the liner or the thin or ultrathin liner. The impact on the liner is minimized and controlled through the use of specialized tools. In one embodiment, the anvil is constructed of a suitable polymeric material that provides for elasticity and recession of the surface of the anvil to reduce and/or cushion the liner from the impact of the die. In an embodiment a method of forming a cut adhesive backed label on a liner comprises providing a web of label stock comprising a facestock, a pressure sensitive adhesive layer adhered to the facestock and a release liner adhered to the adhesive layer; feeding the web of label stock to a cutting station to form a plurality of cut adhesive backed labels and a surrounding matrix on the release liner, where the cutting station comprises a die and an anvil, and the anvil comprises an elastic, polymeric material; stripping the matrix from the cut adhesive backed labels and matrix on the liner; and winding the cut adhesive backed labels on the liner into a roll. The embodiments described throughout this application for a method of forming or an apparatus for forming a cut adhesive backed label on a liner, where a web of linered label stock is cut without separating the liner from the facestock and the adhesive layer, are useful individually and in combinations of two or more.

In an embodiment, as depicted in FIGS. 8 and 9, a method of forming a cut adhesive backed label on a liner comprises providing a web of label stock comprising a facestock, a pressure sensitive adhesive layer adhered to the facestock and a release liner adhered to the adhesive layer; feeding the web of label stock to a cutting station to form a plurality of cut adhesive backed labels and a surrounding matrix on the release liner, where the cutting station comprises a die and an anvil, and the die is a rotary die or a flexible rotary die and a die bridge provides an automatic adjustment of the force applied to each side of the die to a set point force; stripping the matrix from the cut adhesive backed labels and matrix on the liner; and winding the cut adhesive backed labels on the liner into a roll. In an embodiment an automated die bridge, which provides automatic adjustment of force and as depicted in FIG. 9, comprises a control device to apply force to each side of a rotary die, a means to continuously monitor the force on each side of the die during the cutting process, a means of feedback to the control device, and a means to adjust the applied force on each side of the die in real time. In an embodiment the automated die bridge loads a rotary die against a rotary anvil using pneumatic or hydraulic force where the die bridge has pressure sensing devices such as for example load cells on each end of the die bridge to measure the load being applied to the rotary die to keep it fixed against the rotary anvil, and the die bridge has a means such as for example a programmable logic controller to detect and automatically correct for drift in the sensed load compared to a set point load. The automated die bridge allows for cutting a web of linered label stock without cutting the liner and without separating the liner and also allows for an automatic shutdown of the die cutting process when the force of the die against the anvil reaches a preset control limit to prevent die related defects or to signal need to retool and/or replace the die due to wear.

In one embodiment, the proximity of the die to the anvil is adjusted to provide for cutting through the facestock and adhesive and maintaining a kiss cut depth of the cutting edge. Adjustments to the proximity of the anvil to the die may be in the x, y and/or z direction, depending upon the wear of the cutting surface, the type of adhesive used and environmental conditions. The proximity of the die to that anvil is measured using electrostatic control, as shown in FIG. 9, which measures the current flowing across the die/anvil gap with sufficient sensitivity to detect current changes between the two surfaces. Through the use of linear or other suitable digital drives, the gap between the die and anvil is adjusted by moving the die and/or anvil closer or further away. Controlling the proximity or distance between the die and the anvil allows cutting of the facestock and the adhesive layer of a web of linered label stock without cutting the liner and without the need to separate the liner. In an embodiment a method of forming a cut adhesive backed label on a liner comprises providing a web of label stock comprising a facestock, a pressure sensitive adhesive layer adhered to the facestock and a release liner adhered to the adhesive layer; feeding the web of label stock to a cutting station to form a plurality of cut adhesive backed labels and a surrounding matrix on the release liner, wherein the cutting station comprises a die and an anvil, and the distance between the die and the anvil is controlled to prevent cutting the release liner; stripping the matrix from the cut adhesive backed labels and matrix on the liner; and winding the cut adhesive backed labels on the liner into a roll. The distance between the die and anvil can be controlled by any suitable means to include in an embodiment an electrostatic controller.

Apparatus for Die Cutting Label Stock

In an embodiment, as depicted in FIG. 2, an apparatus, for forming a cut adhesive backed label on a liner by processing a label stock comprising a facestock, a pressure sensitive adhesive layer adhered to the facestock and a release liner adhered to the adhesive layer, comprises a separator station for separating the liner from the facestock and adhesive layer; a cutting station for forming a plurality of cut adhesive backed labels and a surrounding matrix from the facestock and the adhesive layer, where the cutting station comprises a flexible rotary die and an anvil roller where the flexible rotary die comprises a die plate that is mechanically fastened to a mounting cylinder, and adhesive of the adhesive layer is cooled at the cutting station to reduce tack of the adhesive where the adhesive contacts the die which is cooled; a laminator for laminating the release liner to the cut adhesive backed labels and matrix; a stripper for stripping the matrix from the cut adhesive backed labels and matrix on the liner; and means for winding the cut adhesive backed labels on the liner into a roll. In embodiments the above described chilled flexible rotary die comprises a thermally conductive material that fills an air gap formed between the die plate and the mounting cylinder, and the mounting cylinder is a magnetic mounting cylinder.

In an embodiment, as depicted in FIG. 6, an apparatus, for forming a cut adhesive backed label on a liner by processing a label stock comprising a facestock, a pressure sensitive adhesive layer adhered to the facestock and a release liner adhered to the adhesive layer, comprises a separator station for separating the liner from the facestock and adhesive layer; a cutting station for forming a plurality of cut adhesive backed labels and a surrounding matrix from the facestock and the adhesive layer, wherein the cutting station comprises a die and an anvil, the cutting surface of the die is lubricated with a lubricant using a flexographic printing plate, and adhesive of the adhesive layer contacts the die; a laminator for laminating the release liner to the cut adhesive backed labels and matrix; a stripper for stripping the matrix from the cut adhesive backed labels and matrix on the liner; and means for winding the cut adhesive backed labels on the liner into a roll.

In embodiments, as depicted in FIGS. 8 and 9, an apparatus, for forming a cut adhesive backed label on a liner by processing a label stock comprising a facestock, a pressure sensitive adhesive layer adhered to the facestock and a release liner adhered to the adhesive layer, comprises a cutting station for forming a plurality of cut adhesive backed labels and a surrounding matrix on the liner from the label stock, where the cutting station comprises a die and an anvil, and the cutting station comprises at least one component selected from the group consisting of where the anvil is an elastic polymeric anvil, means to control the distance between the die and anvil to prevent cutting the release liner, the die is a rotary die and a die bridge provides an automatic adjustment of the force applied to each side of the die to a set point force, and a combination of two or more of any of the foregoing components; a stripper for stripping the matrix from the cut adhesive backed labels and matrix on the liner; and means for winding the cut adhesive backed labels on the liner into a roll.

While the invention has been explained in relation to its preferred embodiments, it is to be understood that various modifications thereof will become apparent to those skilled in the art upon reading the specification. Therefore, it is to be under stood that the invention disclosed herein is intended to cover such modifications as fall within the scope of the appended claims.

What is claimed is:

1. A method of forming a cut adhesive backed label on a liner, comprising:
   providing a web of label stock comprising a facestock, a pressure sensitive adhesive layer adhered to the facestock and a release liner adhered to the adhesive layer, wherein the release liner has a thickness less than or equal to 0.00626 mm;
   feeding the web of label stock to a cutting station to form a plurality of cut adhesive backed labels and a surrounding matrix on the release liner, wherein the cutting station comprises a die and an anvil, and the anvil comprises an elastic, polymeric material;
   stripping the matrix from the cut adhesive backed labels and matrix on the liner; and
   winding the cut adhesive backed labels on the liner into a roll.

2. The method of claim 1 wherein the distance between the die and the anvil is controlled to prevent cutting the release liner.

3. The method of claim 1, wherein the facestock comprises paper or a polymeric film.

4. The method of claim 1, wherein the facestock comprises more than one polymer film layer.

5. The method of claim 4, wherein at least two of the more than one polymer film layers are separated by an internal adhesive layer.

6. The method of claim 1, wherein a surface of the facestock is corona treated, flame treated, or top coat treated.

7. The method of claim 1, wherein the facestock comprises printed information.

8. A method of forming a cut adhesive backed label on a liner, comprising:
   providing a web of label stock comprising a facestock, a pressure sensitive adhesive layer adhered to the facestock and a release liner adhered to the adhesive layer, wherein the release liner has a thickness less than or equal to 0.00626 mm;
   feeding the web of label stock to a cutting station to form a plurality of cut adhesive backed labels and a surrounding matrix on the release liner, wherein the cutting station comprises a die and an anvil, and the die is a rotary die and a die bridge provides an automatic adjustment of the force applied to each side of the die to a set point force;

stripping the matrix from the cut adhesive backed labels and matrix on the liner; and winding the cut adhesive backed labels on the liner into a roll.

9. The method of claim 8, wherein the facestock comprises paper or a polymeric film.

10. The method of claim 8, wherein the facestock comprises more than one polymer film layer.

11. The method of claim 10, wherein at least two of the more than one polymer film layers are separated by an internal adhesive layer.

12. The method of claim 8, wherein a surface of the facestock is corona treated, flame treated, or top coat treated.

13. The method of claim 8, wherein the facestock comprises printed information.

14. A method of forming a cut adhesive backed label on a liner, comprising:

provIding a web of label stock comprising a facestock, a pressure sensitive adhesive layer adhered to the facestock and a release liner adhered to the adhesive layer, wherein the release liner has a thickness less than or equal to 0.00626 mm;

feeding the web of label stock to a cutting station to form a plurality of cut adhesive backed labels and a surrounding matrix on the release liner, wherein the cutting station comprises a die and an anvil, and the distance between the die and the anvil is controlled to prevent cutting the release liner, wherein the anvil comprises an elastic, polymeric material;

stripping the matrix from the cut adhesive backed labels and matrix on the liner; and winding the cut adhesive backed labels on the liner into a roll.

15. The method of claim 14 wherein the distance between the die and the anvil is controlled with an electrostatic controller.

16. The method of claim 14, wherein the facestock comprises paper or a polymeric film.

17. The method of claim 14, wherein the facestock comprises more than one polymer film layer.

18. The method of claim 17, wherein at least two of the more than one polymer film layers are separated by an internal adhesive layer.

19. The method of claim 14, wherein a surface of the facestock is corona treated, flame treated, or top coat treated.

20. The method of claim 14, wherein the facestock comprises printed information.

* * * * *